(12) United States Patent
Brown

(10) Patent No.: US 9,784,006 B2
(45) Date of Patent: Oct. 10, 2017

(54) PORTABLE TOILETS AND PORTABLE RESTROOM ARRANGEMENTS

(71) Applicant: Porta-Can & Bottle Holdings LLC, Greensboro, NC (US)

(72) Inventor: John T. Brown, Liberty, NC (US)

(73) Assignee: Porta-Can & Bottle Holdings, LLC, Greensboro, NC (US)

( * ) Notice: Subject to any disclaimer, the term of this patent is extended or adjusted under 35 U.S.C. 154(b) by 0 days.

(21) Appl. No.: 15/044,026

(22) Filed: Feb. 15, 2016

(65) Prior Publication Data

US 2016/0160516 A1 Jun. 9, 2016

Related U.S. Application Data

(63) Continuation-in-part of application No. 14/190,714, filed on Feb. 26, 2014, now Pat. No. 9,260,876.

(60) Provisional application No. 61/769,356, filed on Feb. 26, 2013.

(51) Int. Cl.
  *A47K 4/00*  (2006.01)
  *E04H 1/12*  (2006.01)
  *A47K 11/02* (2006.01)
  *A47K 11/12* (2006.01)

(52) U.S. Cl.
  CPC ............ *E04H 1/1216* (2013.01); *A47K 11/02* (2013.01); *A47K 11/12* (2013.01)

(58) Field of Classification Search
  CPC ..................................................... A47K 4/00
  USPC ..................................... 4/449–486
  See application file for complete search history.

(56) References Cited

U.S. PATENT DOCUMENTS

| | | | | |
|---|---|---|---|---|
| 3,066,311 A | * | 12/1962 | Tharp ................ | A47K 4/00 4/449 |
| 3,423,766 A | * | 1/1969 | Eger ................ | E03D 11/11 4/317 |
| 3,601,821 A | * | 8/1971 | Corsiglia ............ | E04H 1/1216 4/300 |
| 3,629,874 A | * | 12/1971 | Beller ................ | E04H 1/1216 4/462 |
| 3,992,727 A | * | 11/1976 | Elkins ............... | E03D 13/00 280/47.31 |
| 4,163,294 A | * | 8/1979 | Patterson ........... | A47K 11/02 4/111.1 |
| 4,380,836 A | * | 4/1983 | Braxton ............. | E04H 1/1216 4/449 |
| 4,493,118 A | * | 1/1985 | Braxton ............. | A47K 3/32 4/449 |
| 4,581,780 A | * | 4/1986 | Hoskins ............. | A47K 11/03 4/209 R |
| D341,193 S | * | 11/1993 | Hart ................. | A47K 11/02 D23/302 |
| D345,217 S | * | 3/1994 | Pearlson ............ | A47K 11/03 D25/16 |
| 5,437,065 A | * | 8/1995 | Sakawa ............. | E04H 1/1266 4/342 |

(Continued)

*Primary Examiner* — Lori Baker
(74) *Attorney, Agent, or Firm* — NK Patent Law, PLLC

(57) ABSTRACT

A portable toilet is provided. The toilet includes a shelter defining a rounded sidewall, the sidewall having a door, and the shelter further including a toilet assembly. The toilet further includes a roof configured for removable engagement with the shelter. The toilet has a storage configuration when the roof is inverted and at least partially housed within the shelter, and the toilet has an bottle configuration when the roof is engaged with the shelter.

18 Claims, 10 Drawing Sheets

(56) References Cited

U.S. PATENT DOCUMENTS

| | | | | |
|---|---|---|---|---|
| 6,349,426 | B1 * | 2/2002 | Wieringa | A47K 11/02 4/449 |
| 6,374,432 | B1 * | 4/2002 | Morris | A47K 11/12 4/144.1 |
| 6,418,672 | B1 * | 7/2002 | Hampel | E04H 1/1216 4/460 |
| 6,427,256 | B1 * | 8/2002 | Mullett | A47K 11/02 4/449 |
| 6,668,392 | B2 * | 12/2003 | Mason | E04H 1/1216 4/449 |
| 6,944,888 | B1 * | 9/2005 | Canales, Jr. | E03D 9/052 4/213 |
| 6,997,204 | B2 * | 2/2006 | Sansom | E03C 1/122 137/14 |
| D519,645 | S * | 4/2006 | Wright | E03C 1/122 D25/16 |
| D545,451 | S * | 6/2007 | Urbanek | E03C 1/122 D25/16 |
| D546,967 | S * | 7/2007 | Masuda | E03C 1/122 D25/16 |
| D589,627 | S * | 3/2009 | Shreck | E04H 15/003 D21/811 |
| 7,877,823 | B2 * | 2/2011 | Hentschel | E04H 15/003 4/470 |
| 8,079,096 | B2 * | 12/2011 | Roberts | E03D 7/00 4/317 |
| 8,091,157 | B2 * | 1/2012 | Tyler | E04H 1/1216 4/477 |
| D683,864 | S * | 6/2013 | Taylor | E04H 1/1216 4/449 |
| 9,060,652 | B2 * | 6/2015 | Bikker | A47K 4/00 |
| 9,260,876 | B1 * | 2/2016 | Brown | E04H 1/1216 |
| 9,289,101 | B2 * | 3/2016 | Weir | A47K 11/04 |
| 9,309,683 | B1 * | 4/2016 | Huang | F24F 7/00 |
| 2003/0121093 | A1 * | 7/2003 | Braxton | E04H 1/1216 4/476 |
| 2006/0123534 | A1 * | 6/2006 | Paar | E04H 1/1216 4/479 |
| 2011/0000011 | A1 * | 1/2011 | Gebka | G09F 15/00 4/321 |
| 2012/0144576 | A1 * | 6/2012 | Taylor | E04H 1/1216 4/476 |
| 2012/0192344 | A1 * | 8/2012 | Novotny | E04H 1/1216 4/476 |

\* cited by examiner

PORTABLE TOILETS AND PORTABLE RESTROOM ARRANGEMENTS

CROSS REFERENCE TO RELATED APPLICATIONS

This application is a continuation-in-part of U.S. patent application Ser. No. 14/190,714 filed Feb. 26, 2014 and titled "PORTABLE TOILETS AND PORTABLE RESTROOM ARRANGEMENTS," which claims the benefit of U.S. Provisional Application No. 61/769,356 filed Feb. 26, 2013 and titled "PORTABLE TOILETS AND PORTABLE RESTROOM ARRANGEMENTS", both of which are incorporated herein by reference in their entirety.

TECHNICAL FIELD

The present disclosure relates generally to toilet buildings, and more particularly to improved portable toilet shelters and portable restroom shelter schematic arrangements.

BACKGROUND

Portable toilets are free-standing structures having minimal enclosures for use as temporary toilets. Portable toilets are widely used at various events, such as sporting events, festivals, concerts and a variety of other large gatherings of people. Typically, portable toilets include an open-front U-shaped toilet seats with a cover. The toilet is generally gravity fed into a waste tank. Often the waste tank includes a chemical disinfectant to minimize unappealing odors and the like.

Portable toilets are efficient for handling the needs of large gatherings, however they are often eyesores or otherwise diminish the aesthetics of the event. Similarly, the footprints of traditional portable toilets are large and unappealing to event planners and patrons, and may distract from adjacent advertising. Space for storage and transportation of portable toilets not having traditional shapes can often become an issue.

Therefore, Applicants desire systems and methods for appealing portable toilets having configurations without the drawbacks presented by the traditional systems and methods.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In accordance with the present disclosure, portable toilets and their configurations are provided for various uses. This disclosure provides improved toilet structures and arrangements that are convenient, efficient, and safe, particularly when used for large gatherings of people. This disclosure may also allow for branding and advertisement avenues.

According to at least one embodiment, a portable toilet is provided. The toilet includes a shelter defining a rounded sidewall having a door, the shelter including a toilet assembly; a roof configured for removable engagement with the shelter, wherein the toilet has a storage configuration when the roof is inverted and at least partially housed within the shelter, and wherein the toilet has an bottle configuration when the roof is engaged with the shelter.

According to at least one embodiment, a portable toilet is provided. The toilet includes a shelter defining a rounded sidewall and having a door, the shelter including a toilet assembly; a bottle roof and a can roof selectively engageable with the shelter; wherein the toilet has a bottle configuration when the bottle roof is engaged with the shelter, wherein the toilet has a storage configuration when the bottle roof is inverted and at least partially housed within the shelter, and wherein the toilet has a can configuration when the can roof is engaged with the shelter.

According to some embodiments, the toilet further includes a porous ceiling for providing structural support to the roof.

According to some embodiments, the toilet further includes a base including rails for supporting and transporting the shelter.

According to some embodiments, the shelter defines an inwardly tapered bottom including vents, the bottom positioned adjacent and below the sidewall.

According to some embodiments, the toilet assembly includes a holding unit in fluidic connection with a urinal, and a toilet seat having a port therethrough and in alignment with the holding unit.

According to some embodiments, an exterior of the sidewall includes a body wrap.

According to some embodiments, the body wrap substantially covers the sidewall and the door is pivotable about hinges.

According to some embodiments, the body wrap is removable.

According to some embodiments, an exterior and/or a top of the roof includes a roof wrap.

According to some embodiments, the roof wrap is removable.

According to some embodiments, an interior of the roof or bottle roof is hollow, thereby permitting a plurality the roofs to be stacked.

According to some embodiments, the toilet further includes a non-skid floor within the shelter.

According to some embodiments, the toilet further includes a second roof configured for removable engagement with the shelter, wherein the toilet has a can configuration when the roof is engaged with the shelter.

According to some embodiments, the roof, the second roof, the bottle roof and/or the can roof includes a cap having vents.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
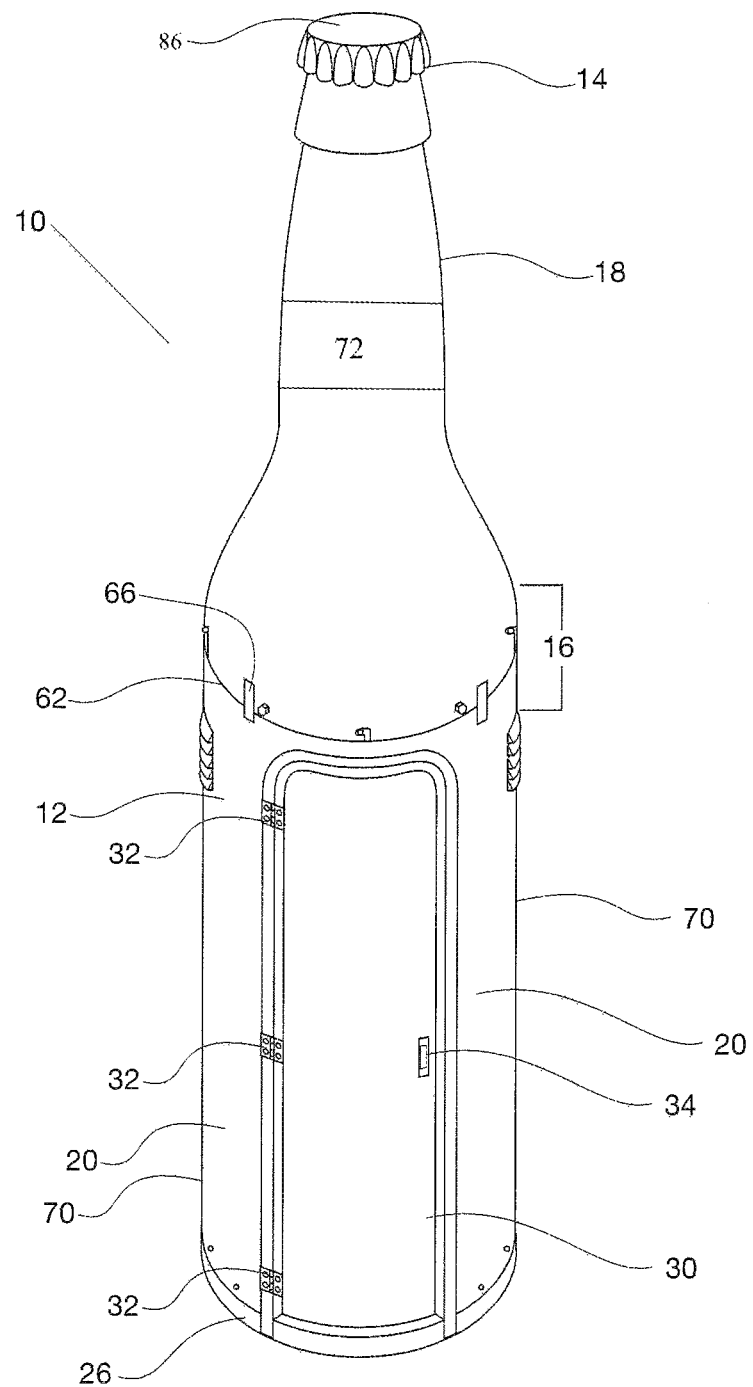
FIG. 1 is a front perspective view of a portable toilet according to one or more embodiments of the present invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters.

In the following description, like reference characters designate like or corresponding parts throughout the several views. Although the term "step" may be expressly used or implied relating to features of processes or methods, no implication is made of any particular order or sequence among such expressed or implied steps unless an order or sequence is explicitly stated. Also in the following description, it is to be understood that such terms as "forward," "rearward," "left," "right," "upwardly," "downwardly," and the like are words of convenience and are not to be construed as limiting terms.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

As is shown in FIG. 1, a portable toilet 10 is shown embodied according to one embodiment of the present disclosure. As shown in FIG. 1, portable toilet 10 includes a shelter 12 having a rounded sidewall and a selectively engageable roof 14. The roof may be conical shaped, similar to the shape of the upper portion of a bottle, or the roof may be shaped to appear similar to the shape of the upper portion of a can. The assembled shelter 12 and roof 14, when engaged with each other, may form a bottle configuration 82, imitating the appearance of a drinking bottle or the like, or may form a can configuration 84, imitating the appearance of a drinking can or the like. As would be apparent to one skilled in the art, the can or bottle shape may vary. The roofs 14 may be interchangeable, each being similarly selectively engageable with the shelter 12. The can shape may imitate a typical soda can, a 'tall boy', a skinny can, a 'mini', or any number of cylindrical drinking containers. Further, the bottle shape may imitate a typical beer bottle, a wine bottle, a champagne bottle or any number of cylindrical drinking containers with a conical, undulating or tapered upper portion.

Figure 7:
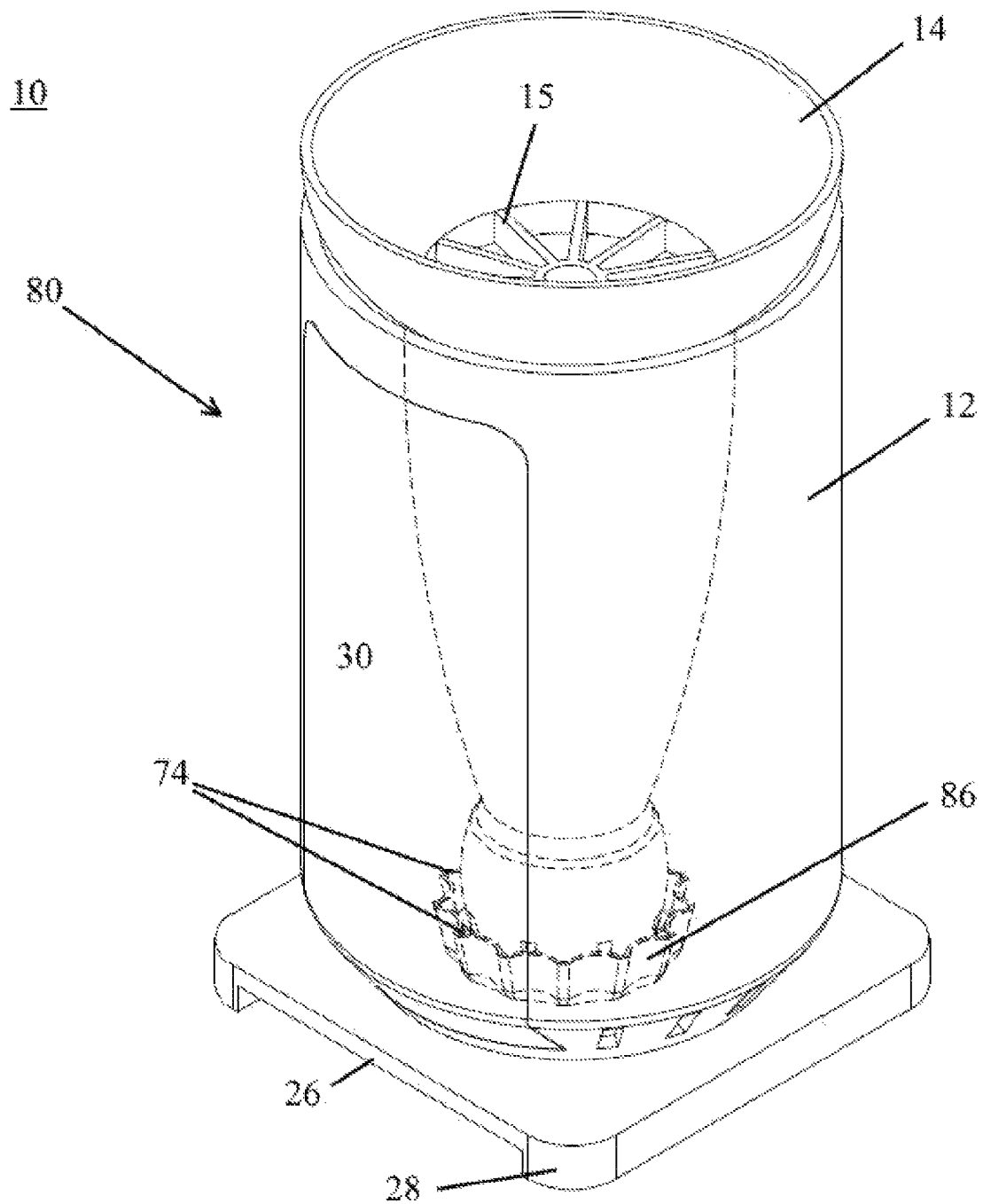
FIG. 7 is a front perspective view of the portable toilet in a storage configuration according to one or more embodiments of the present invention.
Figure 8:
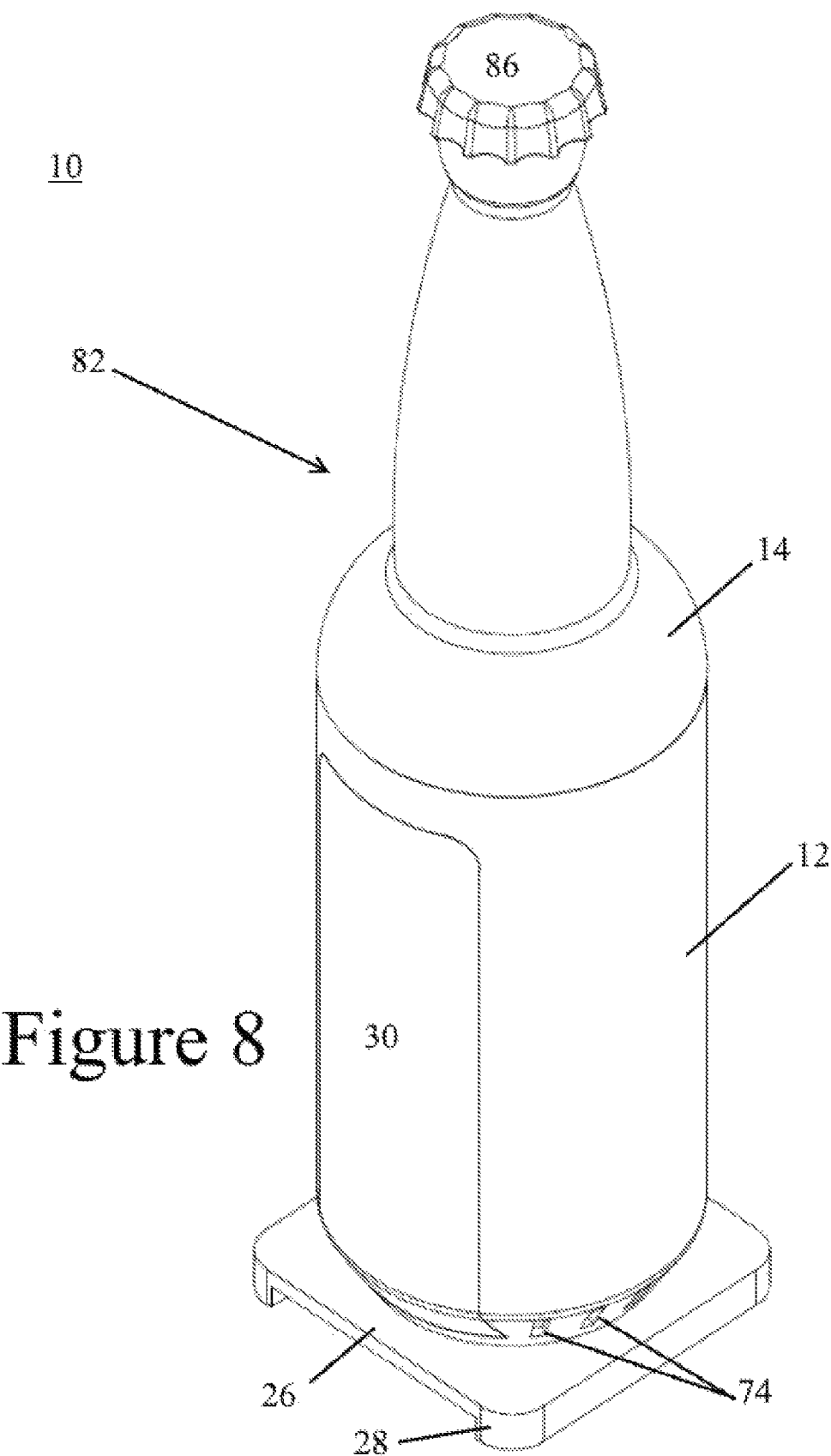
FIG. 8 is a front perspective view of the portable toilet in a bottle configuration according to one or more embodiments of the present invention.
Figure 9:
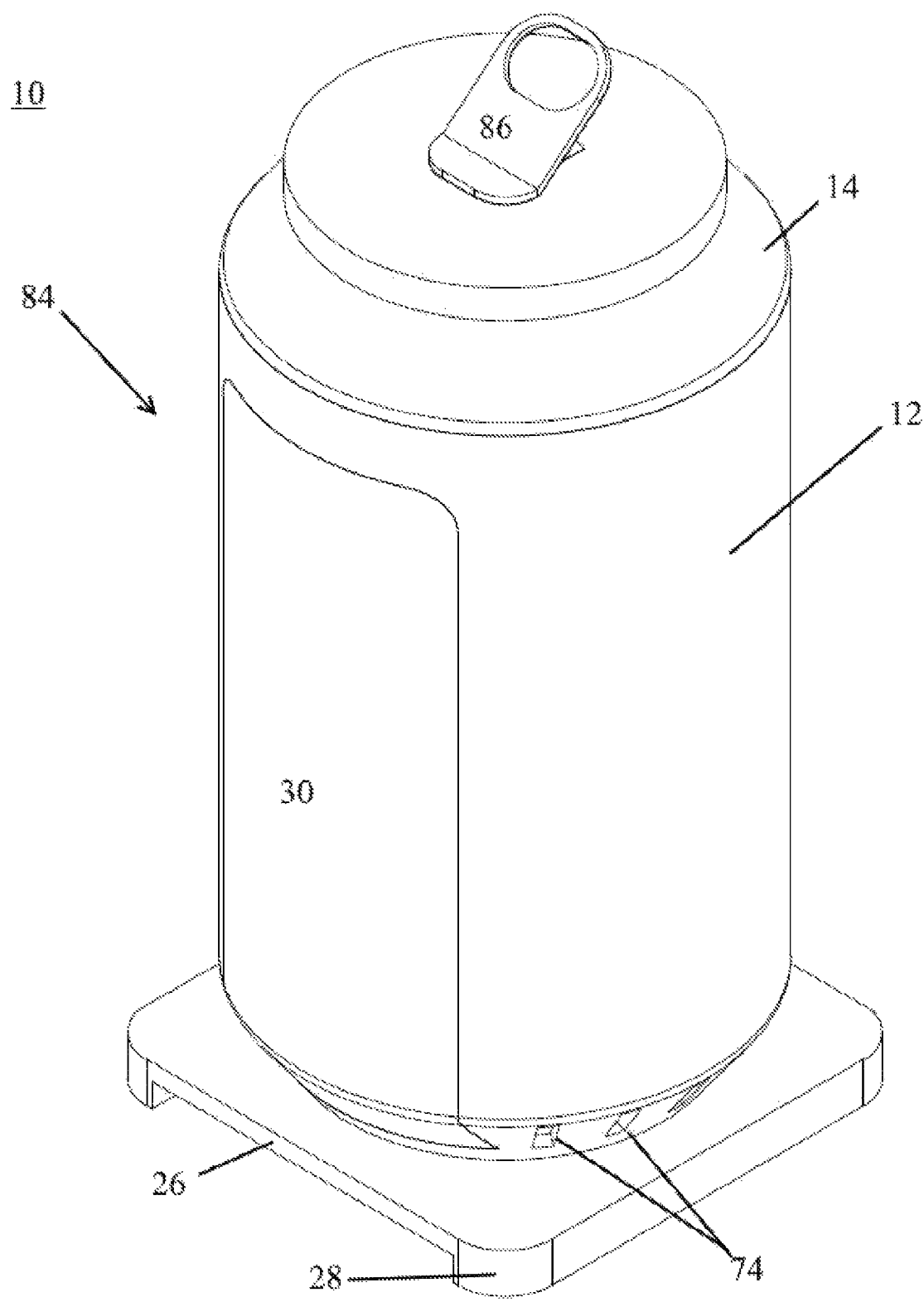
FIG. 9 is a front perspective view of the portable toilet in a can configuration according to one or more embodiments of the present invention.
Figure 10:
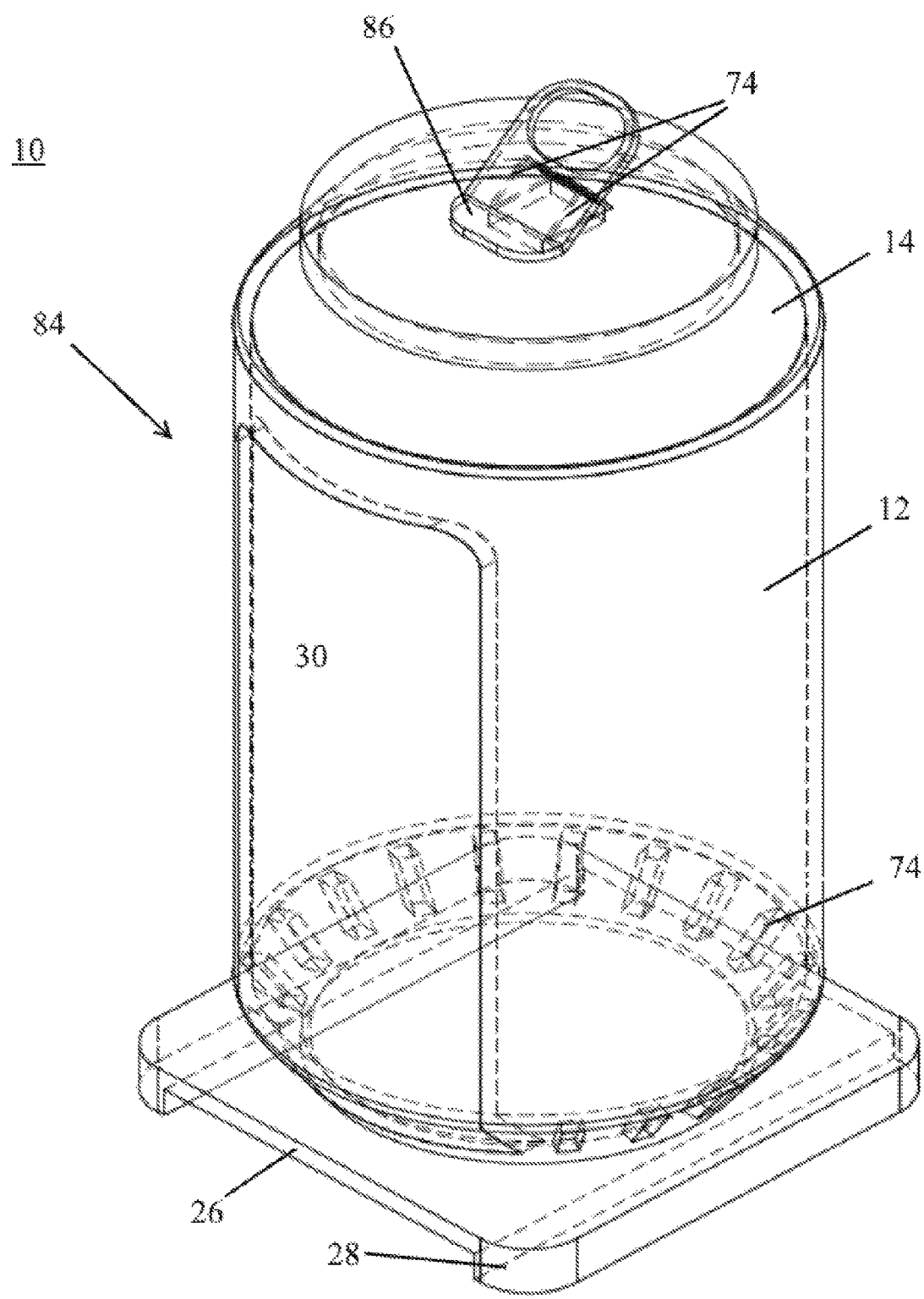
FIG. 10 is a front perspective view of the portable toilet in a can configuration showing internal details according to one or more embodiments of the present invention.

Additional embodiments of the portable toilet 10 are depicted in FIGS. 7-10. The toilet 10 may include a shelter 12 defining a rounded sidewall 20 having a door 30. The toilet 10 may further include a roof 14 configured for removable engagement with the shelter 12, wherein the toilet 10 has a bottle configuration 82 when the roof 14 is engaged with the shelter 12 (FIG. 8), and wherein the toilet 10 has a storage configuration 80 when the roof 14 is inverted and at least partially housed within the shelter 12 (FIG. 7). Additionally, the toilet may have a can configuration 84 when a can roof 14 is engaged with the shelter 12 (FIGS. 9 and 10).

In still yet another embodiment, 13, a portable toilet 10 is provided including a shelter 12 defining a rounded sidewall 20 and having a door 30, the shelter 12 including a toilet assembly 40. The toilet 10 may further include a roof 14 selectively engageable with the shelter 12, and a waterproof ceiling 15 selectively engageable with both the shelter 12 and the roof 14. The toilet 10 may have several configurations, including: a can configuration 84 when the roof 14 is disengaged from the shelter 12 and the ceiling 15 is engaged to the shelter 12; a bottle configuration 82 when the roof 14 is engaged with the shelter 12 and the ceiling 15 is engaged to both the shelter 12 and the roof 14; and a storage configuration 80 when the roof 14 is inverted and at least partially housed within the shelter 12 (e.g., see FIG. 7), and the ceiling 15 is engaged only with the roof 14.

According to some embodiments, the toilet 10 may include a ceiling 15. The ceiling 15 may be non-porous or waterproof (FIG. 2A), or may be porous and ribbed (FIG. 3). Further, the ceiling 15 may be selectively engageable with the shelter 12, the roof 14, or both the shelter 12 and the roof 14. For example, the ceiling 15 may be engaged to both the shelter 12 and the roof 14 in the bottle configuration 82. As is depicted in FIG. 7, the ceiling 15 may be porous and be integrally formed with the roof 14 for providing structural support thereto. Such a roof 14 may also provide for easy maneuverability of the roof 14.

Further, as depicted in FIGS. 9 and 10, the toilet 10 may further have a can configuration 84 when a can-shaped roof 14 is engaged with the shelter 12. In such an embodiment, there may be no ceiling 15. The toilet 10 may, as shown, include a base 26 including rails 28 for supporting and transporting the shelter 12. The base 26 may be round, square, rectangular, or any other shape. Further, the shelter 12 may define an inwardly tapered bottom 21 including vents 74 for venting gases and fluids, the bottom 21 positioned adjacent and below the sidewall 20.

As is additionally depicted in FIGS. 1, 4 and 8-10, the roof 14 may include a cap 86. In embodiments where the roof 14 forms a bottle configuration 82, the cap 86 may be shaped to imitate a bottle top and include downward facing vents 74 within the jagged edges of the cap's periphery. In embodiments where the roof 14 forms a can configuration 84, the cap 86 may be shaped to imitate a tab of a can, and include vents 74 underneath the cap 86. In each embodiments the vents 74 of the roof 14 and/or cap 86 are shielded from the weather elements so that the interior of the portable toilet 10 is protected from the adverse weather elements, such as rain. Further, the position of vents 74 on the cap 86 and/or roof 14 permits convection to push air thereout. The cap 86 may be integrally formed with the roof or may be selectively engaged therewith.

As shown in FIG. 1, portable toilet 10 typically includes a free-standing shelter 12 and an upper roof 14. The shelter 12 includes a generally rounded, including cylindrical, sidewall 20 supported above a base 26 to fully, or at least substantially, enclose the shelter 12. The base 26 may be constructed of solid plastic and is generally adapted to be lifted, for instance by a forklift or the like, and positioned into place, including any of the schematic arrangements shown and described herein. Other sidewall embodiments include other non-rectangular shaped designs.

In at least one embodiment, a body wrap 70, a roof wrap 72, or a body wrap 70 and a roof wrap 72 may be provided. The outer face of the sidewall 20, the exterior of the roof 14, and/or the top of the roof 14 may be at least partially, flat or smooth to retain a removable, or permanent, body wrap 70 and/or roof wrap 72. The body wrap 70 may fully or partially encircle the sidewall 20. The roof wrap 72 may fully or partially encircle the exterior and/or top of the roof 14. In particular examples, body wrap 70 and/or roof wrap 72 is removably secured, for instance with adhesives, fasteners and the like. In yet other examples, the body wrap 70 is inserted into a protective sleeve 76 along the sidewall 20 or the roof 14. Any of the body wrap 70 and/or roof wrap 72 examples discussed herein may include advertisements, labeling, color or scenic schemes and the like to create a marketing and/or aesthetically-pleasing appearance. The body wrap 70 may cover the door 30 while still permitting the door 30 to pivot or move.

The shelter 12 includes a door 30 to the interior housing. In some examples, the door opening is about seventy-five inches high and about twenty-six inches wide. The door 30 may be reversible, so as to allow both right-sided and left-sided entry, depending on the particular schematic arrangement. The door 30 may include one or a plurality of hinges 32, or the like, so that the door 30 may be hingedly opened from one side, by pivoting for example. The hinges 32 may be fastened to the toilet shelter 12 with fasteners, but may also be integrally fastened thereto using a variety of thermoforming or heat lamination techniques. Further, the door 30 may include a handle 34. Again, the handle 34 may be repositionable along the door 30 to meet the particular usage, including any of the portable toilet schematic arrangements shown and described herein.

As shown in FIG. 1, the upper roof 14 may be generally tapered to imitate the top of a drinking bottle, for instance a beer bottle, wine bottle or the like. In particular examples, the roof 14 is generally conical in shape with slight tapered edges and a substantially flat upper surface. As illustrated, the upper roof 14 may have a generally tapered edge 18 leading away from its distal end, while the proximate end may include a generally squared ledge leading to the toilet shelter 12.

Typically, the roof 14 is removeably secured, or engaged, to the shelter 12. The removable roofs 14 may be hollow for permitting a plurality of the roofs 14 to be stacked for efficient storage and transport between locations. However, other examples may include arrangements where the tapered roof 14 is permanently secured to the shelter 12. A quick connection assembly 16 may provide efficient assembly and disassembly during maintenance. In some embodiments of the bottle configuration 84, the male roof connector 62 may be aligned over the female shelter connector (shown in FIG. 2A). In particular examples, fasteners 66 may further secure the upper roof 14 to the shelter 12 in an assembled position. Those of ordinary skill in the art having the benefit of this disclosure will recognize that the fasteners 66 may be screws, rivets, thermoformed members or the like.

Figure 2A:
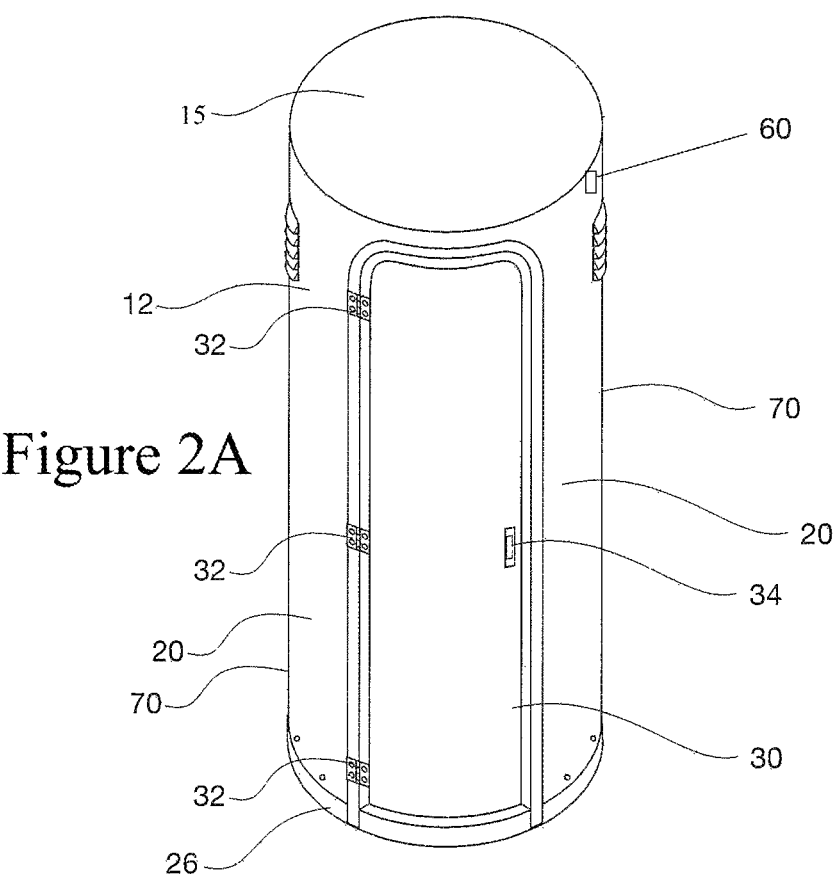
FIG. 2A is a front perspective view of the shelter embodiment introduced in FIG. 1 according to one or more embodiments of the present invention.
Figure 3:
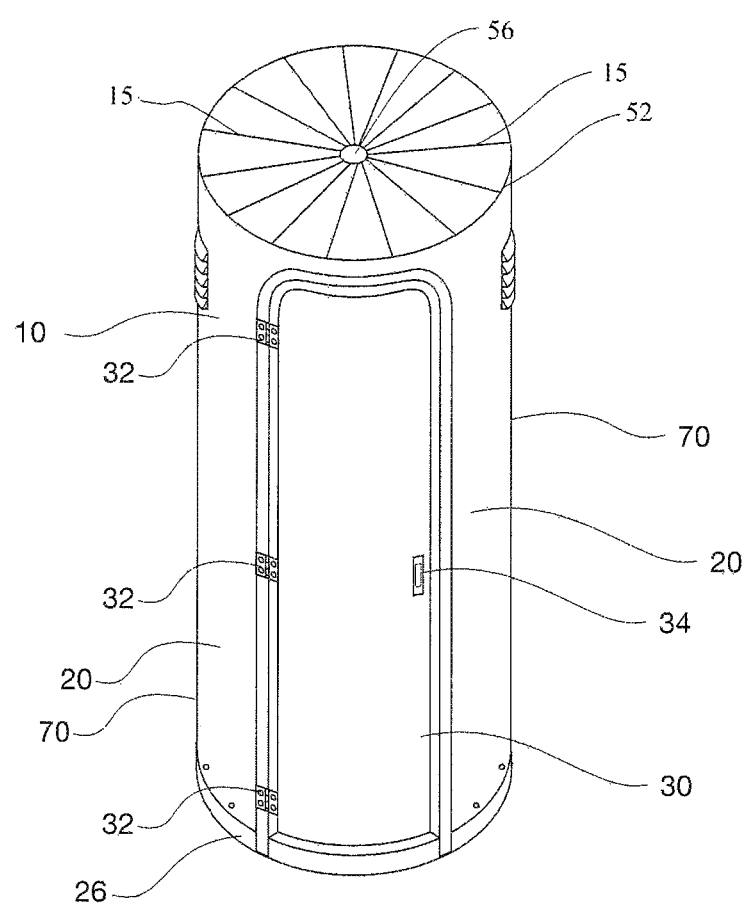
FIG. 3 is a front perspective view of another portable toilet according to one or more embodiments of the present invention.

FIG. 2A shows one example of a shelter 12 disassembled from the roof 14. In particular examples, the shelter 12 is about ninety inches in height and about forty-two inches wide. The shelter 12 may be a continuous plastic design with a total weight of about two hundred and twenty five pounds. Other examples include additional dimensions and weights. The shelter 12 typically includes a structural support ceiling 15 to enclose the shelter 12. The ceiling 15 may be weatherproof to protect the occupant from the elements regardless if the tapered roof 14 is secured thereto. As illustrated, the ceiling 15 may further include a female shelter connector 60 around its periphery to mate with the corresponding male roof connector 62. Typically, the male connector 62 traverses water away from the shelter 12 when the elements are in the bottle configuration 82. However, in other embodiments, the female and male connectors 60, 62 may be reversed, i.e. the ceiling 15 may include a male connector 62 and the roof 14 may include a female connector 60.

Figure 2B:
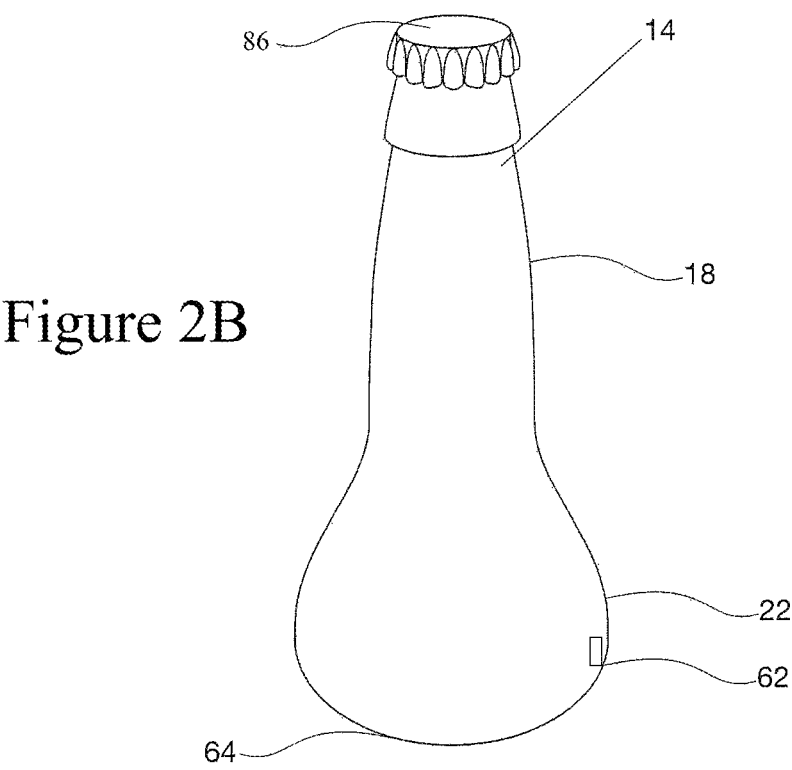
FIG. 2B is a side perspective view of the removable upper roof of the shelter embodiment introduced in FIG. 1 according to one or more embodiments of the present invention.

FIG. 2B shows an isolated view of a roof 14 removed from the toilet shelter 12. As shown, the design of the roof 14 may be generally conical with tapered edges. For instance, the tapered edge 18 may be generally smaller in diameter than the lower squared edge 22. In particular examples, the diameter of the upper distal end may be about twenty inches, while the diameter of the proximate lower end may be about forty-two inches. Further, in some examples, the roof 14 is about thirty-six inches tall and the weight of the roof may be about twenty-seven pounds. However, additional examples include a variety of diameter arrangements to generally form any conical shape of the roof a 14 and/or different thicknesses and weights.

As illustrated in FIGS. 1 and 2A, the upper distal end of the roof 14 may have an upper roof wrap 72 on the substantially flat top surface. In some examples, the upper roof wrap 72 provides advertising capabilities when viewed from above, for instance from a blimp or the like. The upper distal end of the roof 14 may also include a spiral rail along its periphery to simulate a screw top in a drinking bottle or the like. The lower proximate end of the roof 14 may include a squared edge 22 to mate with the toilet shelter. A male roof connector 62 along the periphery of the squared edge 22 may mate with any of the female shelter connectors 60 shown or described herein. Typically, the interior 64 of the roof 14 is hollow to allow a plurality of disassembled roofs 14 to be stacked to reduce the footprint during storage and transport.

FIG. 3 introduces another embodiment of the portable toilet 10 that generally imitates the exterior appearance of a drinking can or the like in a bottle configuration 82. As shown in FIG. 3, portable toilet 10 may include a shelter 12 having a tapered rounded, including cylindrical, sidewall 20 above its base 26. The toilet 10 may further include a ribbed ceiling 15 above an indented ledge 52. The portable toilet 10 may include a sidewall 20 defining an indented ledge 52 on the periphery of its upper end. The ribbed ceiling 15 is generally flat with ribs extending axially from a center tab 56 or the like. Other examples include a variety of ribbed arrangements to replicate other drinking cans. Similarly, other examples include a variety of center tab 56 orientations, including offset tabs in the ceiling, while yet other examples include no tab 56.

The rounded, including cylindrical, sidewall 20 may be supported above a base 26 to fully enclose the shelter 12. The base 26 may be constructed of solid plastic and is generally adapted to be lifted, for instance by a forklift or the like, and positioned into place, including in position of any of the schematic arrangements shown and described herein. The base 26 may include spaced-apart rails 28 for supporting and transporting the shelter. The rails 28 may be tapered on their ends for easier maneuvering.

Figure 4:
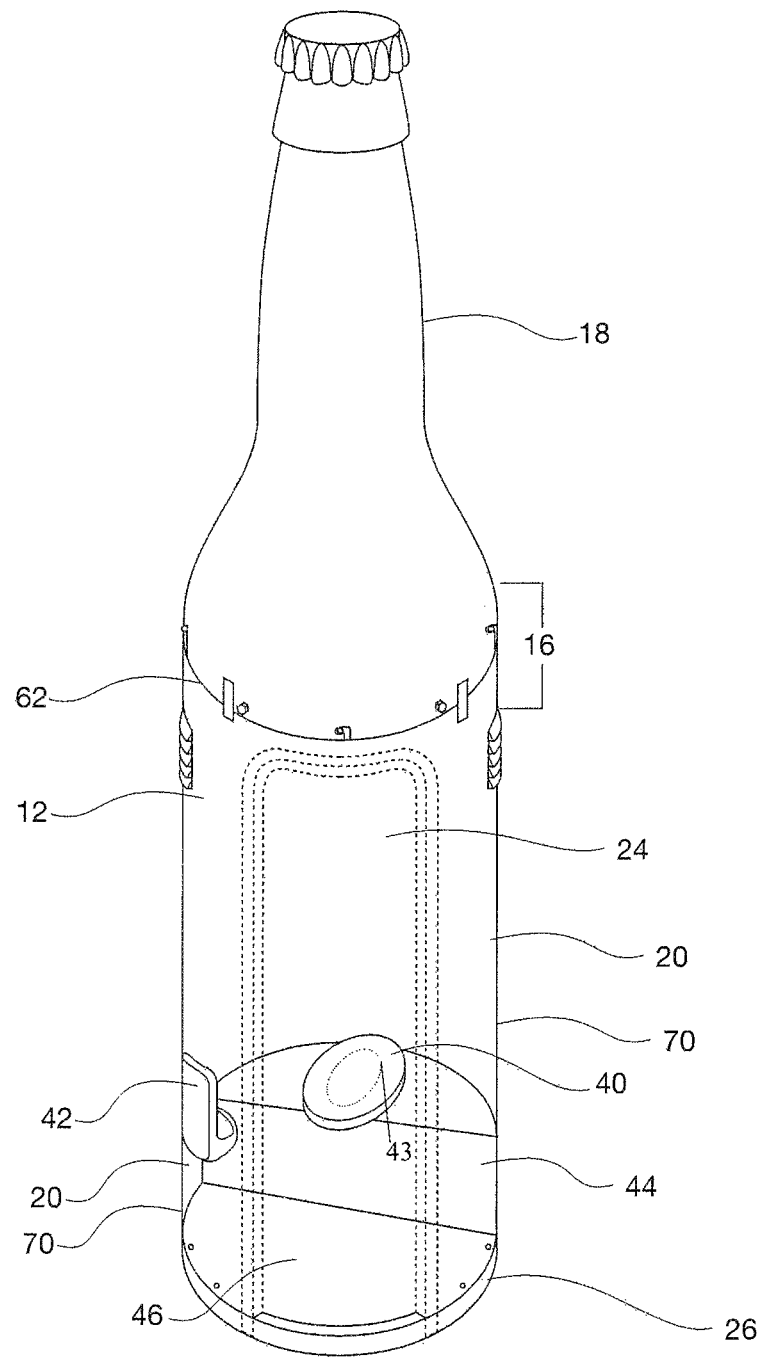
FIG. 4 is a front perspective view of the portable toilet according to FIG. 1, with portions omitted to show internal elements.
Figure 5:
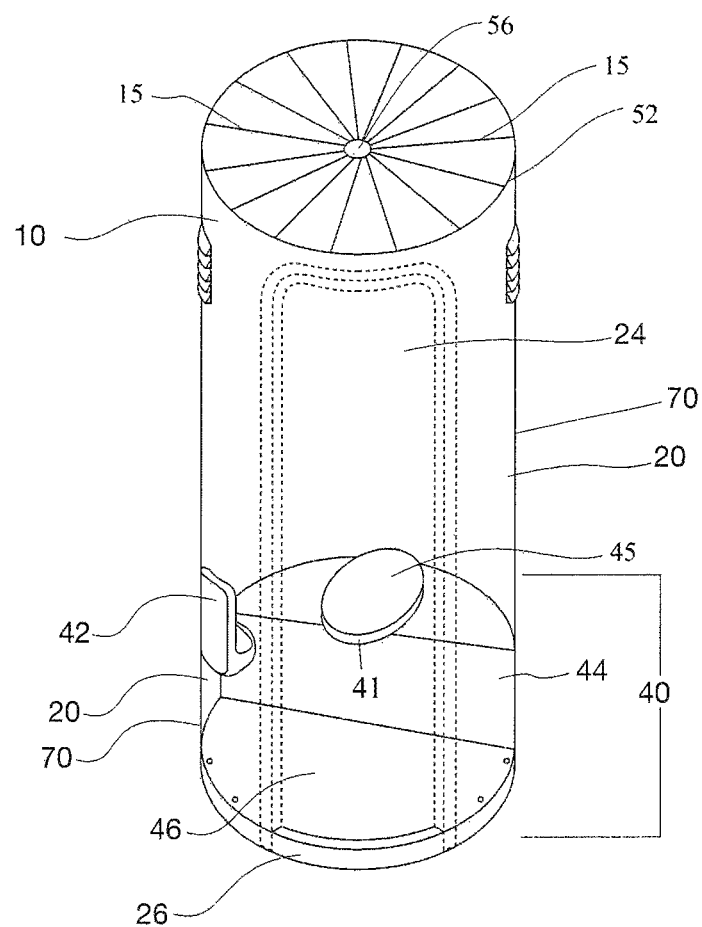
FIG. 5 is a front perspective view of the portable toilet according to FIG. 3, with portions omitted to show internal elements.

FIGS. 4 and 5 introduce elements of the interior housing 24 of the shelters 12. In some embodiments, the shelter 12 may include a toilet assembly 40. The toilet assembly 40 may include a holding unit 44 in fluidic connection with a urinal 42, a port 43 in alignment with the holding unit 44, a seat 41, and/or a lid 45. Typically, the holding unit 44 includes a top wall, sidewalls and bottom wall to generally define a closed receptacle to receive and retain waste and chemicals. The toilet assembly 40 may include a removal port 43 to drain and remove waste. A toilet seat 41 may be mounted to the holding unit 44 which is gravity fed. In other examples, a urinal 42 may be mounted either to a portion of the holding unit 44, the base 26 or to the sidewall 20, and is in fluid communication with the toilet assembly 40. The base 26 may be constructed of solid plastic and its upper surface may include a non-skid floor 46 as a sanitary top surface. In other examples, a potable water sink may be secured in the interior housing 24 in fluid communication with the toilet assembly 40.

Figure 6:
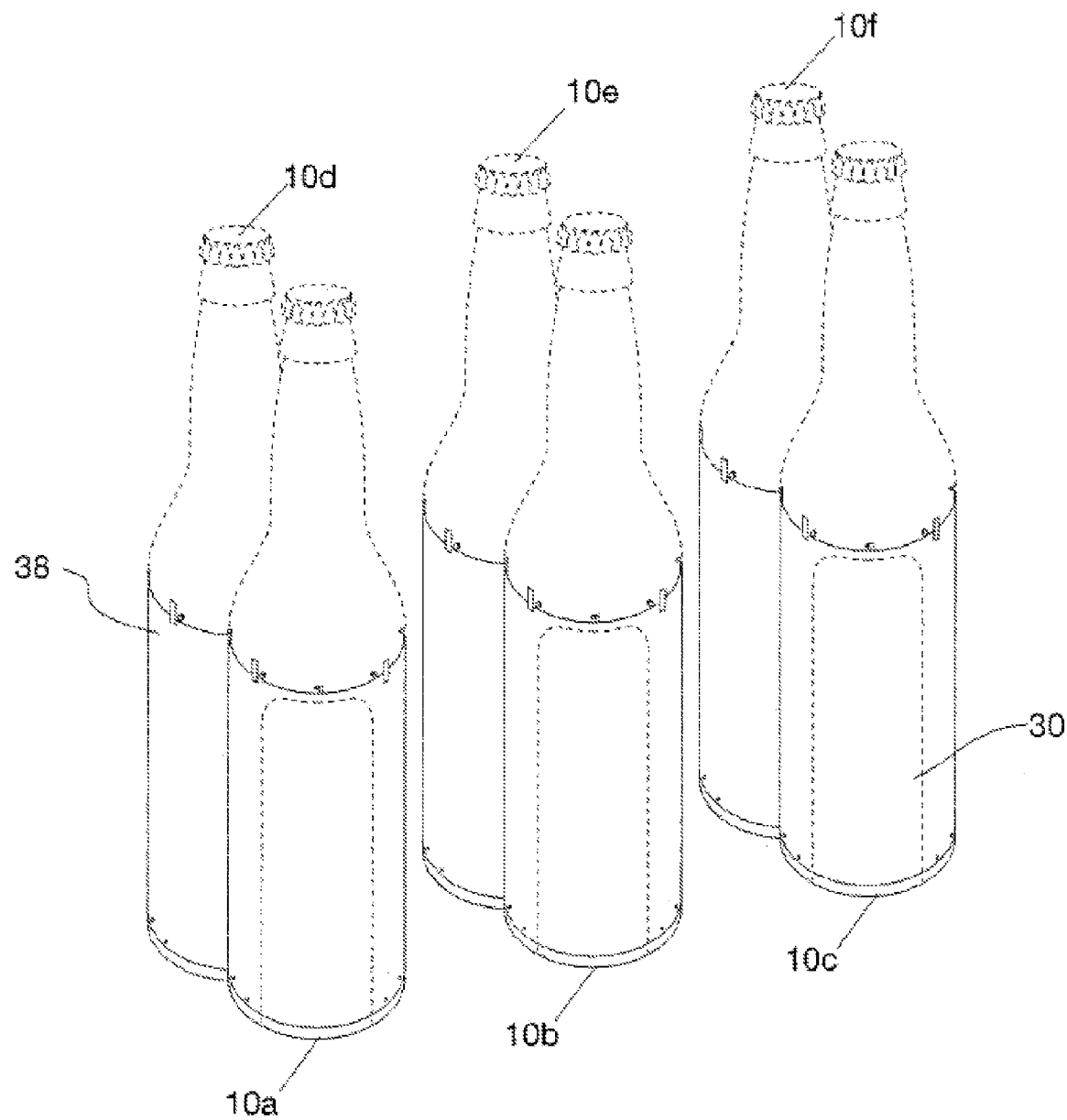
FIG. 6 is a schematic view of an arrangement of portable toilets according to one or more embodiments of the present invention.

Any of the portable toilets 10 shown and described herein may be positioned along a generally flat surface for use in a variety of configurations for a portable restroom arrangement. Exemplary positioning includes rows of portable toilets aligned adjacent to one another replicating a 'six-pack' drink package design. FIG. 6 introduces one such particular schematic arrangement, wherein the six portable toilets 10a-10f are spaced apart from one another and positioned in two adjacent rows, for instance in three toilets 10 per row. Other examples include fewer or greater than three toilets 10 per row. Each door 30 is facing outward to allow convenient access, while the opposing face 38 of each portable toilets 10a-10f are spaced apart from one another and aligned back-to-back. The result is a unique schematic arrangement of a 'six-pack' design. The toilets 10 may be in a bottle configuration 82, can configuration 84 or both when schematically arranged. In particular examples, any of the body wrap 70 and/or roof wrap 72 labels shown and described herein may draw attention to a particular advertising or labeling scheme. This portable toilet schematic may create an aesthetically-pleasing toilet arrangement, wherein patrons may designate the schematic as a landmark, for instance with directions "meet me at the 'X' vender six-pack." Those of ordinary skill in the art having the benefit of this disclosure will recognize other toilet schematics include any variety of arrangements replicating bottle- or can-grouping commercial packaging, including a 'twelve-pack', straight line, wine box, fast-food collection or the like.

In one embodiment of the present disclosure, a portable restroom arrangement includes a first, second, and third rounded portable toilet 10 spaced apart in a first row; and a fourth, fifth, and sixth rounded portable toilet 10 spaced apart in a second row. In one example, the first row and the second row may be positioned substantially opposing one another with the doors 30 aligning outward. In one example, the rear of the first toilet 10 is typically substantially adjacent a rear of the forth toilet 10. The rear of the second toilet 10 is typically substantially adjacent a rear of the fifth toilet 10. The rear of the third toilet 10 is typically substantially adjacent a rear of the sixth toilet 10. Each of the toilets 10 may include any of the toilet embodiments described herein.

In other embodiments, the disclosure includes a portable toilet kit or materials for assemblage. In this embodiment, the kit may comprise a shelter 12, e.g. any of the toilet shelters previously shown or described. The kit may also comprise an upper roof 14, e.g. any of the roofs previously shown or described. In yet other examples, the kit may include a body wrap 70 and/or a roof wrap 72, e.g. any of the wraps previously shown or described.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims. The disclosure is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

The invention claimed is:

1. A portable toilet comprising:
   a shelter defining a rounded sidewall having a door, the shelter including a toilet assembly; and
   a roof configured for removable engagement with the shelter,
   wherein an exterior and/or a top of the roof includes a roof wrap,
   wherein the toilet has a bottle configuration when the roof is engaged with the shelter, and
   wherein the toilet has a storage configuration when the roof is inverted and at least partially housed within the shelter.

2. The portable toilet of claim 1, wherein the roof further includes a porous ceiling for providing structural support to the roof.

3. The portable toilet of claim 1, further including a base including rails for supporting and transporting the shelter.

4. The portable toilet of claim 1, wherein the shelter defines an inwardly tapered bottom including vents, the bottom positioned adjacent and below the sidewall.

5. The portable toilet of claim 1, wherein the toilet assembly includes:
   a holding unit in fluidic connection with a urinal; and
   a toilet seat having a port therethrough and in alignment with the holding unit.

6. The portable toilet of claim 1, wherein an exterior of the sidewall includes a body wrap.

7. The portable toilet of claim 6, wherein the body wrap substantially covers the sidewall and the door is pivotable about hinges.

8. The portable toilet of claim 6, wherein the body wrap is removable.

9. The portable toilet of claim 1, wherein the roof wrap is removable.

10. The portable toilet of claim 1, wherein an interior of the roof is hollow for permitting a plurality of the roofs to be stacked.

11. The portable toilet of claim 1, further including a non-skid floor within the shelter.

12. The portable toilet of claim 1, further including a second roof configured for removable engagement with the shelter, wherein the toilet has a can configuration when the roof is engaged with the shelter.

13. The portable toilet of claim 1, wherein the roof includes a cap having vents.

14. A portable toilet comprising:
a shelter defining a rounded sidewall and having a door, the shelter including a toilet assembly;
a bottle roof and a can roof selectively engageable with the shelter; and
wherein an exterior and/or a top of the roof includes a roof wrap,
wherein the toilet has a bottle configuration when the bottle roof is engaged with the shelter,
wherein the toilet has a storage configuration when the bottle roof is inverted and at least partially housed within the shelter, and
wherein the toilet has a can configuration when the can roof is engaged with the shelter.

15. The portable toilet of claim 14, wherein an interior of the bottle roof is hollow, thereby permitting a plurality of the bottle roofs to be stacked.

16. The portable toilet of claim 14, wherein the shelter defines an inwardly tapered bottom including vents, the bottom positioned adjacent and below the sidewall.

17. The portable toilet of claim 14, wherein an exterior of the sidewall includes a body wrap.

18. The portable toilet of claim 14, wherein the can roof and/or the bottle roof includes a cap having vents.

\* \* \* \* \*